United States Patent [19]

Maguire

[11] Patent Number: 5,310,146
[45] Date of Patent: May 10, 1994

[54] DUAL AXIS LEVELING SYSTEM

[76] Inventor: Edward J. Maguire, 220 Union Church Rd., Salisbury, Md. 21801

[21] Appl. No.: 130,252

[22] Filed: Oct. 1, 1993

[51] Int. Cl.⁵ .......................................... F16M 11/24
[52] U.S. Cl. .................... 248/188.2; 248/188
[58] Field of Search ................. 248/188.2, 188, 188.3, 248/188.4, 649; 52/678, 292; 312/253

[56] References Cited

U.S. PATENT DOCUMENTS

| | | | |
|---|---|---|---|
| 1,255,427 | 2/1918 | Jones | 248/188.3 |
| 1,394,338 | 10/1921 | Nyman | 248/188.2 X |
| 1,772,708 | 8/1930 | Cole . | |
| 1,865,899 | 7/1932 | Gohmann | 248/188.2 |
| 2,227,713 | 1/1941 | Higgins . | |
| 3,282,001 | 11/1966 | Bigalow . | |
| 3,484,064 | 12/1969 | Koenig | 248/188.3 X |
| 3,606,231 | 9/1971 | Kilborn | 52/292 |
| 3,704,560 | 12/1972 | Ratliff | 52/678 X |
| 4,158,937 | 6/1979 | Henry . | |
| 4,192,564 | 3/1980 | Losert | 312/253 |
| 4,518,142 | 5/1985 | Sulcek | 248/649 |
| 4,624,341 | 11/1986 | Lee | 248/188.2 X |
| 4,913,582 | 4/1990 | Barrett . | |
| 5,186,430 | 2/1993 | Ellithorpe . | |
| 5,224,227 | 7/1993 | McGinley | 5/509.1 |

FOREIGN PATENT DOCUMENTS 23646 7/1955 Fed. Rep. of Germany ........ 52/292

Primary Examiner—J. Franklin Foss
Attorney, Agent, or Firm—Henderson & Sturm

[57] ABSTRACT

A dual axis leveling system (10) for a vertical support column (100), wherein, the leveling system (10) comprises a generally open rectangular base member (20) dimensioned to receive a generally rectangular bearing plate member (30); wherein, adjustment means (40) are disposed at the four corners of the base member (20) and the bearing plate member (30) for varying the relative spacing there between at those locations.

5 Claims, 1 Drawing Sheet

DUAL AXIS LEVELING SYSTEM

TECHNICAL FIELD

This invention relates to the field of leveling devices in general, and in particular to a vertical column height adjustment system having a dual axis adjustment capability for vertical columns for the purpose of leveling a deck or other supported structure.

BACKGROUND ART

As can be seen by reference to the following U.S. Pat. Nos. 4,913,582; 5,186,430; 2,227,713; and 1,772,708; the prior art is replete with myriad and diverse leveling arrangements.

While all of the aforementioned prior art constructions are more than adequate for the basic purpose and function for which they have been specifically designed, these patented systems do not even come close to providing the degree of variable adjustment that is provided by the arrangement that forms the basis of the present invention.

As shown in the above-mentioned patents, the prior art at best teaches the use of a pair of adjustable height elements that will only provide a height adjustment along one transverse axis.

Obviously, in instances wherein a true leveling capability is desired the height adjustment arrangement must have a dual axis adjustment capability so that a precision leveling of a vertical column can be achieved.

As a consequence of the foregoing situation, there has existed a longstanding need among both professional and part time carpenters for a new type of vertical column leveling arrangement that employs a dual axis adjustment capability, and the provision of such a construction is a stated objective of the present invention.

DISCLOSURE OF THE INVENTION

Briefly stated, the dual axis leveling system that forms the basis of the present invention comprises, in general, a base unit; a bearing unit; and an adjustment unit which is used to vary the spacing between the base unit and the bearing unit along two transverse and perpendicularly aligned axis.

Both the base unit and the bearing unit have a generally rectangular configuration, wherein, the bearing unit is dimensioned to be received in a nesting fashion relative to the base unit.

As will be explained in greater detail further on in the specification, the adjustment unit comprises four adjustment members operatively disposed at the four corners of the aligned base and bearing units, wherein, each of the adjustment members may be manipulated vary the height of the bearing member and its associated vertical support column about two perpendicularly aligned transverse axis.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
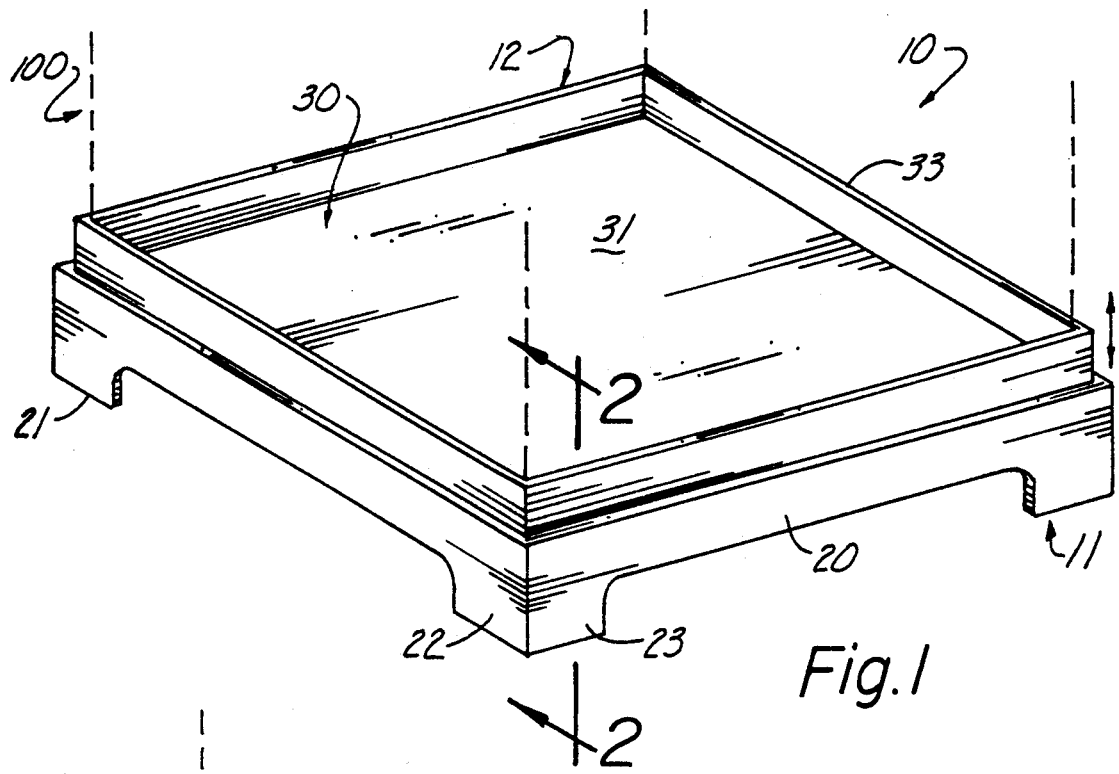
FIG. 1 a perspective view of the dual axis leveling system that forms the basis of the present invention.

As can be seen by reference to the drawings, and in particular to FIG. 1, the dual axis leveling system that forms the basis of the present invention is designated generally by the reference numeral (10). The leveling system (10) comprises a base unit (11); a bearing unit (12), and an adjustment unit (13). These units will now be described in seriatim fashion.

Figure 2:
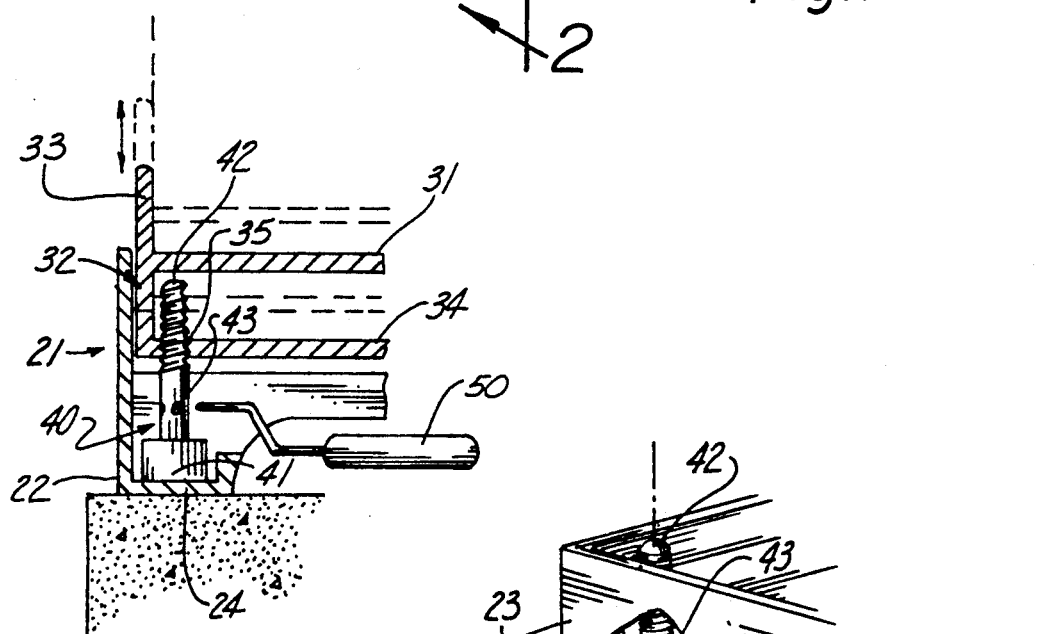
FIG. 2 a cross sectional detail view taken through line 2—2 of FIG. 1.

As shown in FIGS. 1 and 2, the base unit (11) comprises a generally rectangular base plate member (20) having an enlarged central opening (25) and four generally hollow support legs (21) formed on each of the four corners of the base plate member (20).

As can best be seen by reference to FIGS. 1 and 2, each of the support legs (21) of the base plate member (20) are provided with at least two exterior side walls (22)(23) and an inwardly directed and horizontally disposed generally rectangular foot portion (24) attached to the bottom of at least one of the side walls (22) or (23) for reasons that will be explained in greater detail further on in the specification.

Figure 3:
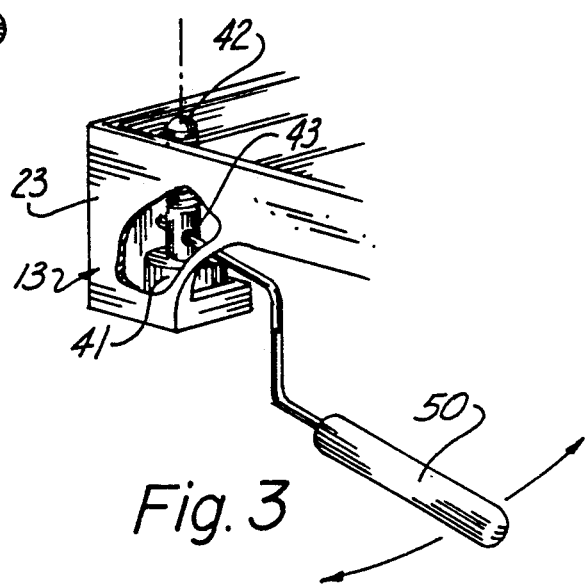
FIG. 3 an isolated perspective view depicting the rotation of the adjustment means.

Turning now to FIGS. 1 through 3, it can be seen that the bearing unit (12) comprises a load bearing support plate member (30) dimensioned to be received in the enlarged central opening (25) in the base plate member (20) and having: a generally rectangular top plate (31) dimensioned to receive a vertical support column (100); a plurality of side walls (32) extending downwardly from the outer edges of the top plate (31); a raised lip portion (33) extending upwardly from the top plate (31) in close proximity to the vertical support column (100); and a generally rectangular bottom plate (34) operatively connected to the side walls (32) at a spaced location relative to the top plate (31).

In addition, the bottom plate (34) is provided with four threaded apertures (35) disposed proximate to, but spaced from the four corners of the bottom plate (34) for reasons that will be explained presently.

As can best be seen by reference to FIGS. 2 and 3, the adjustment unit (13) comprises four threaded adjustment member (40) adapted to be operatively engaged between the base unit (11) and the bearing unit (12); wherein, each adjustment member comprises: an enlarged head element (41), and an elongated threaded shaft (42) that is dimensioned to operatively engage one of the four threaded apertures (35) in the bottom plate (34) of the bearing plate member (30).

In addition, the elongated threaded shaft (42) of each adjustment member (40) is provided with a pair of horizontally disposed and perpendicularly aligned discrete apertures (43) which are dimensioned to receive a suitably dimensioned adjustment tool (50) such as a nail, or the like, for rotating the threaded shaft (42) relative to the threaded apertures (35) in the bottom plate of the bearing member (30).

By now, it should be appreciated that the four corners of the bearing plate member (30) are adjusted relative to the four corners of the base plate member (20) by selective rotation of the threaded adjustment member (40).

It should also be appreciated that this invention also contemplates the substitution of the perpendicularly aligned discrete apertures (43) from the threaded shaft (42) to the enlarged head (41) of the adjustment members (40); and the substitution of apertured flanges (not shown) in lieu of the bottom plate (34) of the bearing plate member (30); wherein, the apertured flanges would project inwardly from the bottom of the side walls (32) at the juncture of each of the sidewalls (32).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A dual axis leveling system for a vertical support column, wherein, the leveling system comprises:
   a base unit, including a base plate member having an enlarged central opening and a plurality of support legs disposed at spaced locations on the periphery of the base plate member, wherein, the bottom of each support leg has an inwardly directed foot portion;
   a bearing unit, including a bearing plate member dimensioned to be received in the enlarged central opening in the base plate member, wherein, the bearing plate member includes: a top plate, dimensioned to receive said vertical support column; a plurality of sidewalls depending downwardly the outer edges of the top plate, and
   a bottom plate connected to said sidewalls and provided with a plurality of threaded apertures that may be placed in alignment with the portions of said like plurality of support legs; and
   adjustment means operatively disposed intermediate the foot portions of the plurality of support legs and the said plurality of threaded apertures in the bottom plate of the bearing plate member for varying the height of the bearing unit relative to the base unit at the spaced locations of said plurality of support leg.

2. The leveling system as in claim 1, wherein, both the base unit and the bearing unit have a generally rectangular configuration, and said plurality of support legs comprises four support legs.

3. The leveling system as in claim 1, wherein, both the base unit and the bearing unit have a generally circular configuration, and said plurality of support legs comprises at least three support legs.

4. The leveling system as in claim 1, wherein, the adjustment means comprises a plurality of threaded adjustment members, wherein, each threaded adjustment member includes an enlarged head element dimensioned to rest on the foot portion of one of the support legs, and an elongated threaded shaft dimensioned to engage one of said threaded apertures in the bottom plate of the bearing plate member.

5. The leveling system as in claim 4, wherein, each adjustment member is further provided with a pair of horizontally disposed and perpendicularly aligned discrete apertures dimensioned to receive a suitably dimensioned tool for rotating the adjustment member relative to the base unit and the bearing unit.

* * * * *